April 6, 1943. H. M. KIECKHEFER 2,315,624
EGG CONTAINER
Filed June 9, 1939
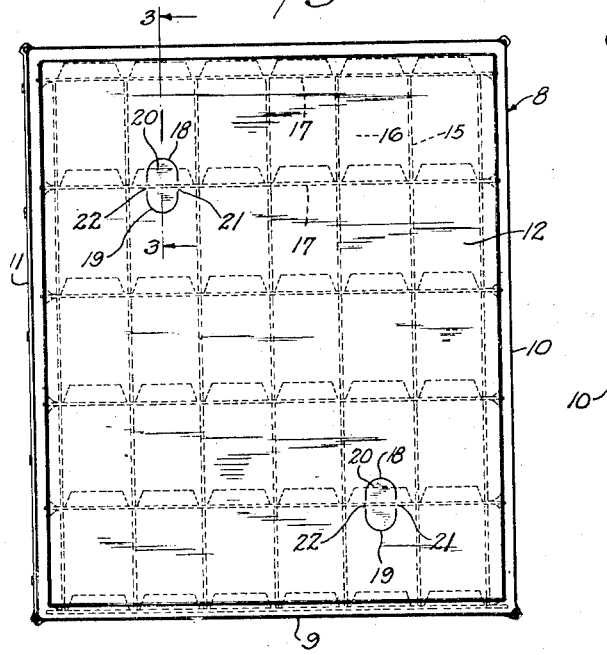
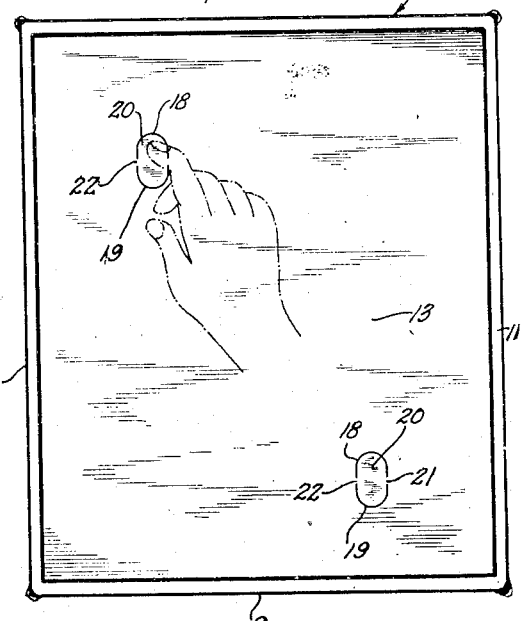
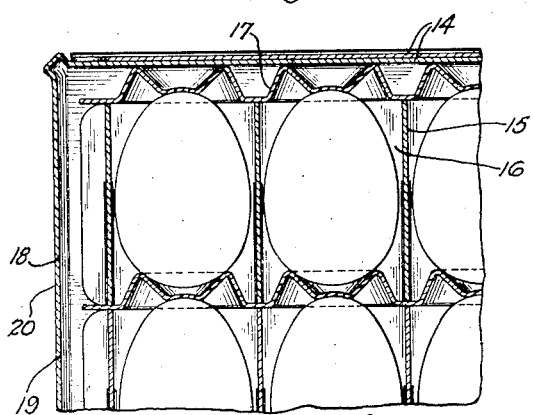
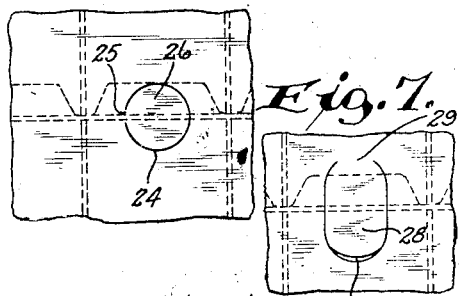
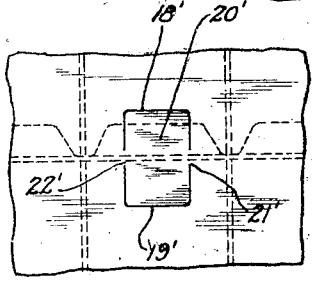
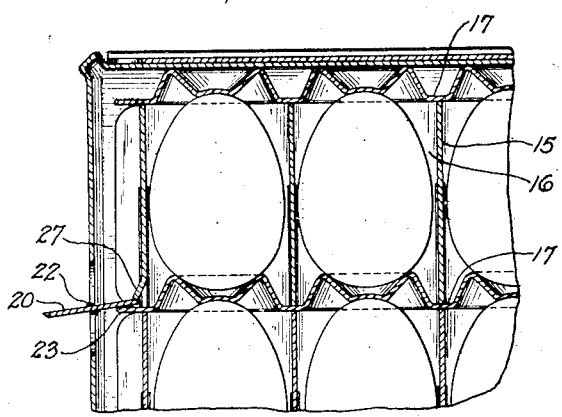
INVENTOR
Hubert M. Kieckhefer
BY
Morsell Liebro Morsell
ATTORNEYS Patented Apr. 6, 1943

2,315,624

UNITED STATES PATENT OFFICE 2,315,624

EGG CONTAINER

Herbert M. Kieckhefer, Riverton, N. J., assignor to Kieckhefer Container Company, Delair, N. J., a corporation of Delaware Application June 9, 1939, Serial No. 278,196

3 Claims. (Cl. 229—6)

This invention relates to improvements in the art of handling eggs and container therefor.

It is common practice to ship eggs in large containers formed of solid fibre or corrugated board, and during such shipment conditions are frequently encountered which make it essential that the container be tight to prevent circulation of air through the eggs and the evaporation of moisture therefrom. For this reason ventilation of egg containers has been avoided, notwithstanding the fact that such ventilation is highly desirable when the eggs are in cold storage. Such ventilation is beneficial because the high humidity in cold storage rooms prevents the eggs from drying out, which drying out would have a tendency to increase the air spots in the eggs. From the above it is apparent that any provision for ventilation of egg containers must be such that the ventilation will not be effective until desired to insure a tight closure during shipment, and, furthermore, the task of rendering such ventilation effective when the eggs arrive at a cold storage warehouse must be a simple and speedy one or it would consume too much time to be practical.

It is therefore one of the objects of the present invention to provide improvements in the art of handling eggs comprising cutting the outlines for ventilation holes in a container without completing said cuts whereby the material within the outlines is left connected to the container in hole closing condition, packing eggs in the container, shipping the eggs with the holes closed to prevent circulation of air through the container during shipment, and opening the ventilation holes when the containers are placed in cold storage to permit the eggs to be subjected to the humid air of the cold storage room.

A further object of the invention is to provide a container normally forming a tight closure and having means which is easily manipulable to provide ventilation when desired, said means being constructed to prevent accidental displacement prior to the time when such ventilation is beneficial.

It is recognized that containers for fruit, vegetables, meat, and the like, have heretofore been provided with ventilated openings. These holes, however, have been of a permanent type, punched out at the time of manufacture of the container, and such a construction would not be suitable for use in connection with the shipment of products such as eggs, where ventilation at certain times would impair the quality of the product. It is further recognized that round holes have been cut in chick boxes and that the cut material has been left in the holes by the container manufacturer. This, however, has been done merely to eliminate the extra manufacturing operation of removing the cut discs from the cut holes, and such discs are later removed to provide ventilation for the chicks during shipment. However, even if such discs were not removed manually, many would be jarred out during handling and shipment and for this reason the chick box type of ventilation would be unsuitable for use in egg containers where positive assurance against circulation of air during shipment is required.

A more specific object of the invention is to provide a container of fibre board or the like having outlines for ventilation holes cut therein, said outlines being incomplete whereby the material therewithin will positively remain in hole closing position until such time as it is desired to manually remove the same to provide ventilation, and there being means whereby a portion of the material can be made to project beyond the outer surface of the container to facilitate removal thereof.

A further specific object of the invention is to provide in a container as above described, cut outlines for ventilation holes with the material within said outlines connected at two opposite points whereby inward pressure on the cut material on one side of said points of connection will cause outward pivoting of the material on the other side to facilitate removal thereof.

A still further object of the invention is to provide a container construction as above described, wherein the incompletely cut-out material is oval or oblong in shape to facilitate manipulation thereof.

With the above and other objects in view, the invention consists of the improvements in the art of handling eggs and container therefor, and all parts and combinations, and all equivalents thereof.

In the accompanying drawing, illustrating preferred embodiments of the invention, in which the same reference numerals designate the same parts in all of the views:

Fig. 1 is an end view of an egg container;

Fig. 2 is a view showing the opposite end of the container and illustrating one method of opening the ventilation holes;

Fig. 3 is an enlarged fragmentary sectional view taken on line 3—3 of Fig. 1;

Fig. 4 is a similar view showing the cut material within the ventilation hole in pivoted, hole opening position;

Fig. 5 is a fragmentary view of a wall of a container illustrating a modified ventilation hole construction;

Fig. 6 is a similar view illustrating another modification; and

Fig. 7 is a similar view illustrating another modification.

Referring more particularly to the drawing, the container designated generally by the numeral 8 is preferably formed of fibre board, corrugated board or the like, and may be of any desired size or shape and may consist of a bottom wall 9, side walls 10 and 11, end walls 12 and 13, and closure flaps 14 forming a top wall when the container is sealed.

Within the container the eggs may be packed in any desired manner but it is preferred to utilize cell forming partitions 15 and 16 and egg flats 17, as illustrated in Figs. 3 and 4, to protect the eggs from one another during shipment.

The improved method of handling eggs which forms the present invention, consists in cutting the outlines for ventilation holes in one or more walls of the container without completing the cuts, whereby the material within the outlines is left connected to the container in hole closing condition, shipping the eggs with the holes closed to prevent circulation of air through the container during shipment, and opening the ventilation holes when the containers are placed in cold storage to permit the eggs to be subjected to the humid air of the cold storage room. Means must be provided for facilitating such opening of the holes, as otherwise the task of the cold storage room attendant would be too time consuming to be practical.

A desirable way of effecting this purpose is illustrated in Figs. 1 to 4 inclusive, wherein the material is cut completely through as at 18 and 19, forming an outline of elongated shape, preferably oval, with the material 20 within the outline connected to the container wall at opposite points as at 21 and 22, the length of tab preferably being parallel to the grain of the fibre board to obtain most efficient functioning. These outlines are shown as cut in both end walls 12 and 13 of the container. Said outlines, however, may be cut in any one or more walls although it is preferred to utilize two opposite walls to insure movement of the air through the container when the holes are open. Provision may also be made for any desired number of holes in a selected wall.

By leaving the cut material 20 connected to the container as at 21 and 22, there is positive assurance that the material will remain in hole closing position during shipment of the eggs. When the containers arrive at a cold storage warehouse, it is merely necessary to press with the finger on one side of the points of connection, as indicated in Fig. 2, whereby the material on the other side of the points of connection will pivot outwardly beyond the outer surface of the box to facilitate removal, as is clearly shown in Fig. 4. The cut material 20 may either be left in the position shown in Fig. 4 to be closed again before further shipment, or completely removed.

It is to be noted that in the preferred arrangement, the points of pivot 21 and 22 are in substantial alinement with edges 23 of the flat 17, whereby a single hole will direct air both above and below said flat. It is also preferred to utilize partitions 15 and 16 which have openings, as is well known whereby the air may travel through the partitions 15 and 16 and into each egg chamber. A similar arrangement is illustrated in Fig. 6, wherein the cut outlines 18' and 19' form a substantially oblong figure surrounding an oblong shaped section of cut material 20'. The outlines 18' and 19' terminate short of each other to leave the material 20' connected to the container wall, as at 21' and 22'.

While it is preferred to have the cut sections 20 or 20' of greater length than width as illustrated, to facilitate manipulation, it is of course possible to have said sections circular or square and still connected at opposite points to the container wall to provide for pivotal action.

The upper and lower ends of the tabs 20 may be angularly cut through the cross-section of the fibreboard as shown at 18 and 19 in Fig. 3 whereby there is support for the tabs prior to their being opened.

In addition, the partition portion 15, adjacent the tabs 20, may be provided with suitable means such as the outwardly bent portions 27 beneath which the tabs snap as shown in Fig. 4 to detachably retain the tabs in open position.

In Fig. 5, there is illustrated another modification wherein the cut outline 24 is circular, the ends of the outline terminating short of meeting to leave a single point of connection 25. This type of construction will hold the cut disc 26 in hole closing position while permitting removal thereof. Such removal, however, is not as easily accomplished as is removal with the form shown in Fig. 1, wherein the cut section is left connected at two opposite points to provide for pivotal action of the type shown in Fig. 4.

In the modification illustrated in Fig. 7 the upper portion of the cut material 28 is left connected as at 29, and a thumb nail notch 30 is provided at the bottom of the tab whereby the material 28 may be made to project beyond the outer surface of the box to facilitate removal thereof, and it is apparent that in all forms of the invention some portion of the tab can be made to project outwardly in a position where it can be readily grasped.

While the present invention is particularly adapted for use in connection with egg containers to solve a particular problem in the handling of eggs, it is obvious that certain aspects of the invention have broader application and are suitable for use in connection with other types of containers wherein ventilation is at certain times desirable.

It is also contemplated that the broader aspects of the invention include the cutting of outlines for ventilation holes through relatively thick fibrous material, wherein said outlines do not extend entirely through the thickness of the board, thereby leaving the material within the outlines connected and yet easily removable.

Although only a few forms of the invention have been shown and described, it is obvious that other modifications and changes may be made without departing from the spirit of the invention and all of such changes are contemplated as may come within the scope of the claims.

What I claim is:

1. In combination, an egg container having walls of fibreboard or the like, means including spaced flats and intervening compartments within the container for supporting and protecting eggs for shipment, cuts in at least one of said walls forming the outline for a ventilation hole, said outline being incomplete, whereby the cut material within the outline is left connected to the wall at opposed points, said cut material being pivotal on said points of connection in response to manual pressure to open the hole, said egg supporting and protecting means extending to a position adjacent said hole and a latch in connection with said egg supporting and protecting means positioned to releasably engage and hold an inwardly pivoted edge of said pivoted material when the latter is in open position.

2. In combination, an egg container having walls of fiberboard or the like, means including spaced flats and intervening compartments within the container for supporting and protecting eggs for shipment, cuts in at least one of said walls forming the outline for a ventilation hole, said outline being incomplete whereby the cut material is left connected to the wall at opposed points which are in substantial alinement with the edge of a flat, said cut material being pivotal on said points of connection in response to manual pressure to open the hole, and the edge of the flat being positioned to limit inward swinging movement of the portion of the cut material which swings inwardly.

3. In combination, an egg container having walls of fiberboard or the like, means including spaced flats and intervening compartments within the container for supporting and protecting eggs for shipment, cuts in at least one of said walls forming the outline for a ventilation hole, said outline being incomplete whereby the cut material is left connected to the wall at opposed points which are in substantial alinement with the edge of a flat, said cut material being pivotal on said points of connection in response to manual pressure to open the hole, and the edge of the flat being positioned to limit inward swinging movement of the portion of the cut material which swings inwardly, and a yielding tongue on the egg protecting and supporting means positioned for automatic engagement with said inwardly swinging portion to normally prevent return swinging movement.

HERBERT M. KIECKHEFER.